United States Patent [19]

Weidner

[11] Patent Number: 4,650,395

[45] Date of Patent: Mar. 17, 1987

[54] COOLABLE SEAL SEGMENT FOR A ROTARY MACHINE

[75] Inventor: Robert H. Weidner, Glastonbury, Conn.

[73] Assignee: United Technologies Corporation, Hartford, Conn.

[21] Appl. No.: 684,657

[22] Filed: Dec. 21, 1984

[51] Int. Cl.$^4$ ............................................. F04D 31/00
[52] U.S. Cl. ..................................... 415/116; 415/115; 415/200; 415/174
[58] Field of Search .............. 415/115, 116, 117, 134, 415/135, 136, 170 R, 174, 200, 216, 217, 138; 416/95, 96, 97 R

[56] References Cited

U.S. PATENT DOCUMENTS

| | | | |
|---|---|---|---|
| 2,488,867 | 11/1949 | Judson | 415/136 |
| 2,651,496 | 10/1953 | Buckland et al. | 415/135 |
| 2,787,440 | 4/1957 | Thompson, Jr. | 415/12 |
| 2,847,185 | 8/1958 | Petrie et al. | 415/115 |
| 2,859,934 | 11/1958 | Halford et al. | 415/115 |
| 2,977,090 | 3/1961 | McCarty et al. | 415/96 R |
| 3,365,172 | 1/1968 | McDonough et al. | 415/117 |
| 3,391,904 | 7/1968 | Albert et al. | 415/170 R |
| 3,411,794 | 11/1968 | Allen | 277/53 |
| 3,575,528 | 4/1971 | Beam, Jr. et al. | 416/34 |
| 3,583,824 | 6/1971 | Smuland et al. | 415/117 |
| 3,588,276 | 6/1971 | Jubb | 416/95 |
| 3,603,599 | 10/1971 | Laird | 277/53 |
| 3,736,069 | 5/1973 | Beam, Jr. et al. | 415/115 |
| 3,742,705 | 7/1973 | Sifford | 60/39.66 |
| 3,781,125 | 12/1973 | Rahaim et al. | 415/136 |
| 3,814,313 | 6/1974 | Beam, Jr. et al. | 236/93 |
| 3,836,279 | 10/1974 | Lee | 415/116 |
| 3,965,066 | 6/1976 | Sterman et al. | 60/39.32 |
| 3,966,356 | 6/1976 | Irwin | 415/217 |
| 4,023,919 | 5/1977 | Patterson | 415/134 |
| 4,076,451 | 2/1978 | Jankot | 415/217 |
| 4,127,357 | 11/1978 | Patterson | 415/116 |
| 4,273,824 | 6/1981 | McComas et al. | 415/174 |
| 4,289,446 | 9/1981 | Wallace | 415/174 |
| 4,337,016 | 6/1982 | Chaplin | 415/116 |
| 4,422,648 | 12/1983 | Eaton et al. | 415/174 |

FOREIGN PATENT DOCUMENTS

| | | |
|---|---|---|
| 1330893 | 9/1973 | United Kingdom . |
| 1484288 | 9/1977 | United Kingdom . |
| 1600722 | 10/1981 | United Kingdom . |
| 2076071 | 11/1981 | United Kingdom ................ 415/217 |
| 2081817 | 2/1984 | United Kingdom . |
| 2117843 | 11/1985 | United Kingdom . |

Primary Examiner—Robert E. Garrett
Assistant Examiner—John Kwon
Attorney, Agent, or Firm—Gene D. Fleischhauer

[57] ABSTRACT

A coolable seal assembly, having a ceramic facing material 76, such as an outer air seal 26, for a gas turbine engine is disclosed. The seal assembly is formed of an array of arcuate seal segments 24. Various construction details which enhance the ability of the seal segment to sustain a thermal shock are disclosed. The seal segment is mountable by conventional means in a rotary machine and includes circumferentially extending flanges 30, 32. The longitudinal continuity of the flanges is interrupted to decrease the effect of the flanges on the overall effective thickness and the local effective thickness of the substrate.

13 Claims, 9 Drawing Figures

COOLABLE SEAL SEGMENT FOR A ROTARY MACHINE

CROSS REFERENCE TO RELATED APPLICATIONS

This application relates to U.S. application Ser. No. 678,518, filed Dec. 5, 1984 for COOLABLE STATOR ASSEMBLY FOR A ROTARY MACHINE by Robert H. Weidner; U.S. application Ser. No. 671,278, filed Nov. 13, 1984 for COOLABLE SEAL ASSEMBLY FOR A GAS TURBINE ENGINE by Robert H. Weidner.

TECHNICAL FIELD

This invention relates to axial flow rotary machines of the type having a flow path for working medium gases. More particularly, the invention is about an array of wall segments, such as the arcuate seal segments of an outer air seal, that extend circumferentially about an axis of the machine for confining the working medium gases to the flow path. Although the invention was conceived during work in the field of axial flow gas turbine engines, the invention has application to other fields which employ rotary machines.

BACKGROUND ART

An axial flow, gas turbine engine typically has a compression section, a combustion section, and a turbine section. An annular flow path for working medium gases extends axially through these sections of the engine. A stator assembly extends about the annular flow path for confining the working medium gases to the flow path and for directing the working medium gases along the flow path.

As the gases are passed along the flow path, the gases are pressurized in the compression section and burned with fuel in the combustion section to add energy to the gases. The hot, pressurized gases are expanded through the turbine section to produce useful work. A major portion of this work is used as output power, such as for driving a free turbine or developing thrust for an aircraft.

A remaining portion of the work generated by the turbine section is not used for output power. Instead, this portion of the work is used in the compression section of the engine to compress the working medium gases. The engine is provided with a rotor assembly for transferring this work from the turbine section to the compression section. The rotor assembly has arrays of rotor blades in the turbine section for receiving work from the working medium gases. The rotor blades have airfoils that extend outwardly across the working medium flow path and that are angled with respect to the approaching flow to receive work from the gases and to drive the rotor assembly about the axis of rotation. The stator assembly has arrays of stator vanes which extend inwardly across the working medium flow path between the arrays of rotor blades. The stator vanes direct the approaching flow to the rotor blades at a desired angle.

The stator assembly further includes an outer case and arrays of wall segments supported from the outer case which extend circumferentially about the working medium flow path. The wall segments are located adjacent to the working medium flow path for confining the working medium gases to the flow path. These wall segments have radial faces which are circumferentially spaced leaving a clearance gap $C_g$ therebetween. The clearance gap is provided to accommodate changes in diameter of the array of wall segments in response to operative conditions of the engine as the outer case is heated and expands or is cooled and contracts.

One example of an array of wall segments is an outer air seal. The outer air seal is part of the stator assembly of the engine and typically is formed of a plurality of arcuate seal segments. The outer air seal circumscribes the rotor blades to confine the working medium gases to the flow path. The stator assembly further includes an engine case, such as an outer case, and a support structure, such as an upstream support and a downstream support for supporting the seal segments of the outer air seal from the outer case. The seal segments are adapted by a pair of flanges to engages these supports. The outer case and the support structure position the seal segments in close proximity to the blades to block the leakage of the gases past the tips of the blades. The inwardly facing surfaces of the seal segments are commonly formed of an abradable material to enable the seal segments to accept rubbing contact with the tips of the rotor blades during operation. As a result of being disposed adjacent to the flow path, the surfaces of the segments and the segments themselves are in intimate contact with the hot working medium gases and receive heat from the gases. The segments are cooled to keep the temperature of the segments within acceptable limits.

One example of an outer air seal formed of segments is shown in U.S. Pat. No. 3,583,824 issued to Smuland et al. entitled "Temperature Controlled Shroud and Shroud Support". Smuland employs an outer air seal which is adapted by an upstream flange 44 and a downstream flange 46 to engage a support. Cooling air is flowed in a cavity which extends circumferentially about the outer air seal between the outer air seal and an engine case. A seal means, such as an impingement plate or baffle, extends circumferentially about the outer air seal to define an impingement air cavity 58 therebetween. A plurality of holes extend through the impingement plate to precisely meter and direct the flow of cooling air through the impingment plate across the compartment 58 and against the outer surface 59 of the seal segment. This cooling creates a large temperature gradient between the outer surface 59 and the surface of the abradable material adjacent to the working medium flow path. The air is then gathered in the impingement air cavity. The cooling air is exhausted from the impingement air cavity through a plurality of axial passages 66 in the downstream hook 46 to provide a continuous flow of fluid through the plate and across the impingement cavity. This cooling air provides convective cooling to the edge region of the outer air seal as its passes through the compartment 64. Another example of a coolable outer air seal is shown in U.S. patent application Ser. No. 678,518 by Weidner executed on Nov. 30, 1984 entitled "Coolable Stator Assembly For a Rotary Machine" the material in which is herein incorporated by reference.

The abradable material on the outer air seal must accept the rubbing contact of the rotor blades without damaging the blades and without destructive results for the outer air seal. In addition, the abradable material must survive in the hostile environment of the turbine section of the engine. Representative abradable seal lands are shown in U.S. Pat. No. 3,817,719 to Schilke et al. entitled "High Temperature Abradable Material and Method of Preparing the Same"; U.S. Pat. No. 3,879,831 to Riggney et al. entitled "Nickle Base High Temperature Abradable Material"; U.S. Pat. No. 3,918,925 to McComas entitled "Abradable Seal"; and U.S. Pat. No. 3,936,656 to Middleton et al. entitled "Method of Affixing an Abradable Metallic Fiber Material to a Metal Substrate".

One attractive material for the abradable surface of the outer air seal is a ceramic facing material. Ceramic facing materials are desirable because of their compatability with the high temperature, hostile environment of the gas turbine engines. In addition, decreased amounts of cooling air are required to protect the seal structure which has a beneficial effect on engine performance. However, the durability of such structures are adversely effected by thermal cycling of the seal segment in the gas turbine engine which can cause cracking and spalling of the ceramic and even separation of the ceramic from the metal. Examples of improved seals having a ceramic facing surface with good resistance to thermal shock are shown in U.S. Pat. No. 4,289,446 entitled "Ceramic Faced Outer Air Seal For Gas Turbine Engines" issued to Wallace and U.S. Pat. No. 4,109,003 issued to Marscher entitled "Stress Relief of Metal Ceramic Gas Turbine Seals". Nevertheless, efforts are continuing to increase the durability of such seal segments to provide seal segments having an improved service life.

Accordingly, scientists and engineers are seeking to develop seal segments which employ ceramic material to form an abradable face, which have a substrate for carrying the ceramic material, and which are supported by conventional techniques in a gas turbine engine.

DISCLOSURE OF INVENTION

This invention is predicated in part on the recognition that the ability of the ceramic facing material to endure thermal shocks (severe thermal cycles) with large temperature gradients is a strong function of the substrate thickness because of the strain it induces in the ceramic structure. This strain is produced as a result of the mismatch between the coefficients of thermal expansion and the moduli of elasticity for the ceramic material and the substrate material when the materials are subjected to the differing temperatures of their operating envelope. The substrate thickness is effectively increased by the presence of flanges which project from the coolable side of the seal segment, such as the flanges used to adapt the seal segment to engage the support structure. These flanges have a local effect and an overall effect on the thickness. Thus, the flanges increase stresses and decrease the ability of the seal to sustain maximum thermal gradients.

A characteristic for measuring the overall effect on thickness of the flanges is called the overall effective thickness. A characteristic for measuring the local effect on thickness of the flange is called the local effective thickness. Accordingly, it is important to take into account the effect that such flanges have on the overall effective thickness of the substrate and on the local effective thickness of the substrate.

According to the present invention, a wall segment has a substrate for a ceramic facing material and flanges fixed to the substrate which are interrupted longitudinally to decrease the effect of the flanges on the local and overall effective thickness of the substrate.

In accordance with one embodiment, each flange has a first section fixed to the substrate which has an opening through the section and a second section extending parallel to the substrate which is interrupted completely in the longitudinal direction by a slot extending to the opening in the first section.

A primary feature of the present invention is an arcuate seal segment for a rotary machine having a ceramic facing layer and a substrate. The ceramic facing layer is fixed to the substrate. Another feature is a pair of flanges which adapt the seal segment to simply engage the adjacent support structure in a rotary machine. Each flange has one or more openings which extend to interrupt the longitudinal length of the flange. In one embodiment, the flange has a first section which is fixed to the substrate and a second section which extends from the first section and is radially spaced from the substrate to leave a circumferentially extending groove therebetween. The openings are in the first section The space between the substrate and the opening in the first section is no greater than twice the thickness of the substrate. A slot in the second section at each opening completely interrupts the longitudinal continuity of the second section and extends to the opening in the first section.

A primary advantage of the present invention is the increased ability of the seal segment to sustain a step function thermal gradient as compared with the same arcuate seal segment having continuous flanges which results from the overall effective thickness and the local effective thickness characteristics of the flange. Another advantage of the present invention is the fatigue life of the seal segment which results from the reduced stresses associated with the longitudinally interrupted flanges as compared with the same arcuate segment having longitudinally continuous flanges.

The foregoing features and advantages of the present invention will become more apparent in light of the following detailed description of the best mode for carrying out the invention and in the accompanying drawings.

BEST MODE FOR CARRYING OUT THE INVENTION

Figure 1:
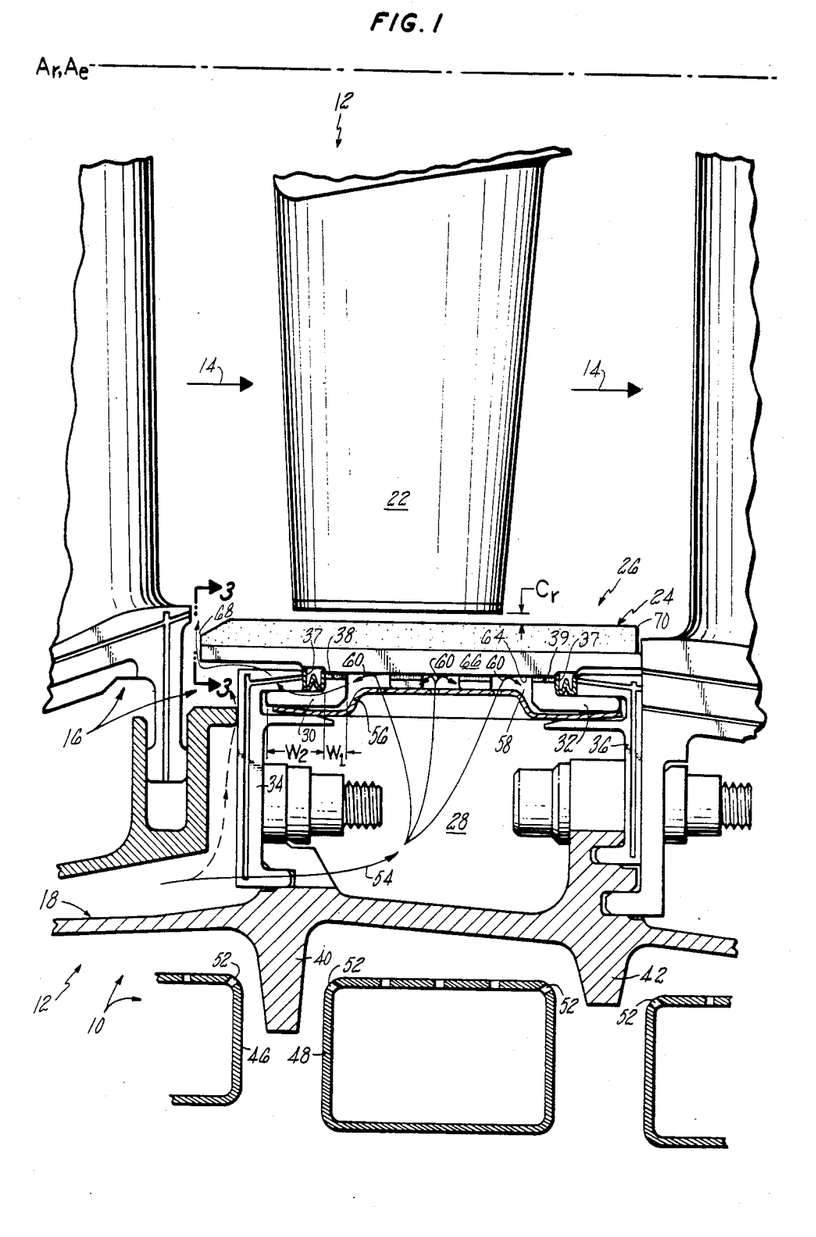
FIG. 1 is a cross sectional view of a portion of an axial flow rotary machine which shows a portion of a turbine section 12 and an axis of rotation $A_r$ of the engine.

FIG. 1 is a side elevation view of an axial flow gas turbine engine 10 which shows a portion of a turbine section 12 and an axis of rotation $A_r$ of the engine. The turbine section includes an annular flow path 14 for working medium gases which is disposed about the axis $A_r$. A stator assembly 16 bounds the working medium flow path. The stator assembly includes an outer case 18. The outer case extends circumferentially about the working medium flow path. A plurality of rotor blades, as represented by the single rotor blade 22, extend radially outwardly across the working medium flow path into close proximity with the outer case.

A stator structure formed of a plurality of arcuate wall segments, as represented by the single arcuate seal segment 24, extends about an axis $A_c$ to bound the annular flow path 14. In the embodiment shown, the arcuate seal segments form an outer air seal 26 which circumscribes the tips of the rotor blades 22. The outer air seal is spaced radially from the rotor blades 22 by a variable clearance $C_r$ to accommodate relative radial movement between the rotor blade and the outer air seal. The outer air seal is spaced radially inwardly from the outer case leaving a circumferentially extending cavity 28 therebetween.

Each arcuate seal segment 24 has an upstream flange 30 and a downstream flange 32. These flanges are spaced axially one from the other and extend circumferentially about the seal segment. The seal segment is adapted by these flanges to engage supports, such as upstream support 34 and downstream support 36, which extend inwardly from the outer case. The supports are attached to the outer case to support and position the outer air seal 26 in the radial direction about the rotor blades. Each support may be segmented to reduce the hoop strength of the support. Flexible seals, such as the seals 37, are disposed between each segment and the array of segments. Each arcuate segment is adapted by a continuous wall 38 on the upstream flange and a continuous wall 39 on the downstream flange to engage its associated seal.

An upstream rail 40 extends circumferentially about the outer case adjacent to the upstream support 34. A downstream rail 42 extends circumferentially about the outer case adjacent to the downstream support 36. A means for impinging cooling air, such as cooling air tube 46 and cooling air tube 48, extends circumferentially about the rails. The tubes are in flow communication with a source of cooling air (not shown) and are adapted by holes 52 to impinge cooling air on the rails.

A first flow path 54 for cooling air extends inwardly of the outer case 18. The first flow path is bounded by the outer case 18 and extends through the engine outwardly of the working medium flow path 14. The flow path extends into the cavity 28 between the outer air seal 26 and the outer case. A circumferentially extending impingement plate 56 is trapped between the outer air seal and the upstream and downstream supports 34, 36. The impingement plate bounds the cavity 28 and is spaced radially from the outer air seal to form a second cavity 58. A secondary flow path, such as the second flow path 60 for cooling air extends axially and circumferentially beneath the outer air seal in the cavity 58. A plurality of impingement holes 62 in the impingement plate places the first flow path 54 in flow communication with the second flow path 60 and enables the cooling air to impinge on the outer surface 64 of the outer air seal.

Figure 2:
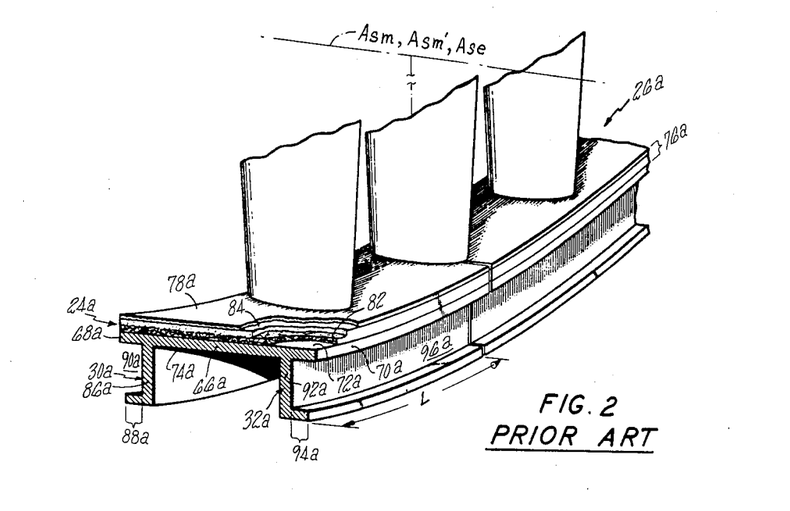
FIG. 2 is a partial perspective view partly in cross section illustrating a prior art construction.

FIG. 2 Prior Art is a partial perspective view showing an outer air seal 26a formed of a plurality of seal segments 24a in accordance with the teachings of the prior art. Because of basic similarities in structure between the construction shown in FIG. 2 and the present invention, the same reference numerals are used for both with the addition of a lower case "a" to the numerals used in FIG. 2.

The arcuate seal segment 24a includes a metallic substrate 66a having a leading edge 68a and a trailing edge 70a which extend circumferentially about the segment. An inwardly facing arcuate surface 72a and an outwardly facing arcuate surface 74a extend axially between the leading edge and the trailing edge. The arcuate surface 72a extend circumferentially about an axis $A_{sm}$ and the arcuate surface 74a extends circumferentially about an axis $A'_{sm}$ which are coincident in the embodiment shown. A ceramic facing material 76a having a ceramic facing surface 78a forms an arcuate sealing surface which extends circumferentially about the axis $A_{se}$. The ceramic facing material is fixed to the substrate as described in U.S. Pat. No. 4,289,446 issued to Wallace entitled "Ceramic Faced Outer Air For Gas Turbine Engine", the material in which is herein incorporated by reference. As shown in Wallace, the ceramic facing material includes a porous metallic pad 82 and an underlayment coating 84 which impregnates the pad for fixing the ceramic facing material to the substrate.

The upstream flange 30a and the downstream flange 32a form a pair of flanges which are fixed to the substrate. These flanges extend circumferentially about the substrate and are axially spaced one from the other. Each flange has a longitudinal length L as measured along a reference surface which is substantially parallel to the outwardly facing surface 74a of the substrate. The upstream flange has a first section 86a which extends outwardly from the substrate and a second section 88a which extends from the second section toward the leading edge 68a. The second section is spaced radially by the first section from the substrate leaving a circumferentially extending groove 90a therebetween. The downstream flange 32a has a first section 92a which extends outwardly from the substrate and a second section 94a which extends axially toward the trailing edge 70a. The second section 94a is spaced radially from the substrate by the first section 92a leaving a circumferentially extending groove 96a therebetween. The grooved flanges adapt the seal segment to engage the upstream and downstream supports.

Figure 3:
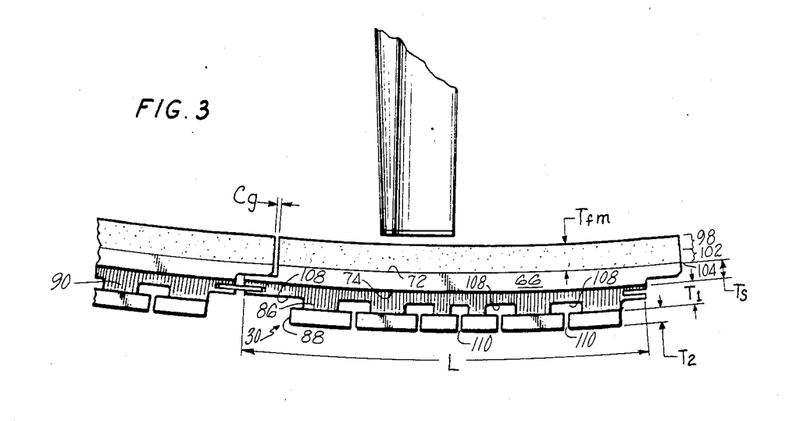
FIG. 3 is a view taken generally along the lines 3—3 of FIG. 1 with portions of an outer support broken away to show the front of a pair of adjacent arcuate seal segments.

FIG. 3 is a front view of the arcuate seal segment 24 shown in FIG. 1 taken along the lines 3—3 of FIG. 1. Portions of the adjacent static structure are broken away to show the upstream flange 30 of the seal segment.

The ceramic facing material 76 has a thickness $T_{fm}$ which lies in a range of 120 to 200 thousanths of an inch (0.120–0.200 inches) and is composed primarily of a refractory oxide and combinations of the refractory oxides such as $ZrO_2$ (zirconium oxide), $Al_2O_3$ (alumina), $MgAl_2O_4$ (spinel) and $3Al_2O_3.2SiO_2$ (mullite). The ceramic facing material has a ceramic surface layer 98, and a ceramic-metal intermediate layer 102 with an associated bond layer 104. The metal used in the ceramic-metallic intermediate layer may be an alloy formed of a metal with chromium, aluminum and yttrium (MCrAlY) with cobalt being the preferred metal (CoCAlY). The ceramic facing material has a modulus of elasticity which varies with temperature and composition for ceramic layers from above $3 \times 10^6$ psi at room temperature to less than $2 \times 10^6$ psi at temperatures above 2400° F. and for the intermediate layers 102 from about $9 \times 10^6$ psi at room temperature to below $4 \times 10^6$ psi at temperatures of about 1,500° F.

Like the arcuate segment 24a shown in FIG. 2, the arcuate segment 24 has a metallic substrate 66, an upstream flange 30 and a downstream flange 32 (not shown). The substrate has an average thickness $T_s$ which extends between the inwardly facing arcuate surface 72 and the outwardly facing arcuate surface 74. The upstream flange and the downstream flange may differ slightly having slightly different radial, longitudinal, and axial lengths and spacing between portions. Nevertheless, both flanges are preferably formed as taught herein. Although reference is made only to the upstream flange, the embodiments shown in FIGS. 3-7 are exemplary of both upstream and downstream flanges.

The flange shown in FIG. 3 has a longitudinal length L along a reference surface which extends substantially parallel to the outer surface 74 of the substrate. The reference surface could extend exactly parallel to such surface, but because there may be minor discontinuities in the surface, the reference surface is substantially parallel to it and is a smooth surface. The first section 86 of the flange extends outwardly from the substrate and has a width $W_1$ as shown in FIG. 1 and a thickness $T_1$. One or more openings 108 extend through the entire width of the first section. The summation of these openings together extend a length along the reference surface L which is greater than or equal to forty percent of the length L to interrupt the longitudinal continuity of the first section. The second section 88 which extends axially from the first section in the direction of the leading edge is spaced radially from the substrate by the first section leaving the circumferentially extending groove 90 therebetween. The second section has a width $W_2$ as shown in FIG. 1 and a thickness $T_2$. A slot 110 at each opening extends through the entire width $W_2$ of the second section and the thickness $T_2$ of the second section to the opening in the first section.

Figure 4:
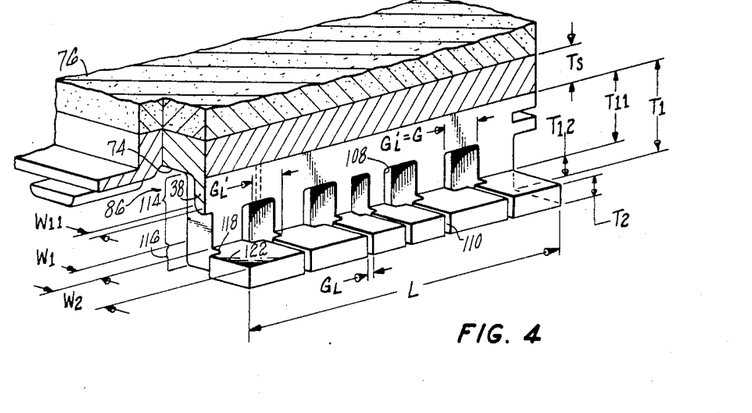
FIG. 4 is a partial perspective view of the seal segment shown in FIG. 3.

FIG. 4 is a partial perspective developed view of the embodiment shown in FIG. 3. The first section 86 of the upstream flange 30 extending outwardly from the outwardly facing surface 78 includes a first region 114 and a second region 116. The first region extends outwardly from the outwardly facing surface of the substrate a distance $T_{11}$ is twice the average thickness $T_s$ of the substrate. The second region extends from the first region and has a width $W_1$ and a thickness $T_{12}$. The openings 108 extend through the entire width of the first section in the second region and extend a length along the reference surface which is greater than or equal to forty percent of the length L of the reference surface to interrupt the longitudinal continuity of the first section. The openings 108 leave a gap G between adjacent portions of the first section.

The first region of the first section has the wall 38 which is formed of longitudinally continuous material. The wall 38 extends from the substrate a distance which is less than or equal to the thickness $T_{11}$ of the first region. The wall has a width $W_1$ in the portions of the first region which extend between the substrate and the uninterrupted portions of the second region. The wall has a wall of reduced width $W_{11}$ which is less than the width $W_1$ in the portions of the first region which extend between the substrate and each opening in the first section.

The second section has a first region 118 adjacent to the first section and a second region 122 extending axially from the first region. The second section has a total width $W_2$ which is the summation of the width of these regions. The slot 110 leaves a gap $G_L$ between adjacent portions of the second section in the second region and leaves a gap $G_L'$ between adjacent portions of the second section in the first region which is greater than or equal to the gap $G_L$ ($G_L' \geq G_L$). In the embodiments shown, the gap G in the first section is equal to the gap $G_L'$.

Figure 5:
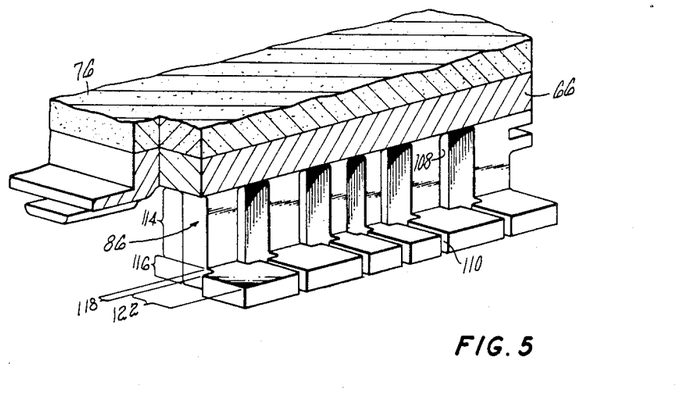
FIG. 5 is an alternate embodiment of the seal segment shown in FIG. 4 with portions of a continuous wall 38 removed.

FIG. 5 is an alternate embodiment of the view shown in FIG. 4 in which the wall 38 is removed. This type of construction is preferable to the constructions shown in FIG. 4 because the wall increases the effective thickness of the substrate as compared with constructions which do not have a wall. However, the wall does provide a sealing surface for more positively engaging the seal segment 37 Alternatively, as shown by the dotted lines in FIG. 3, the opening might include a small slot which extends inwardly to the substrate.

Figure 6:
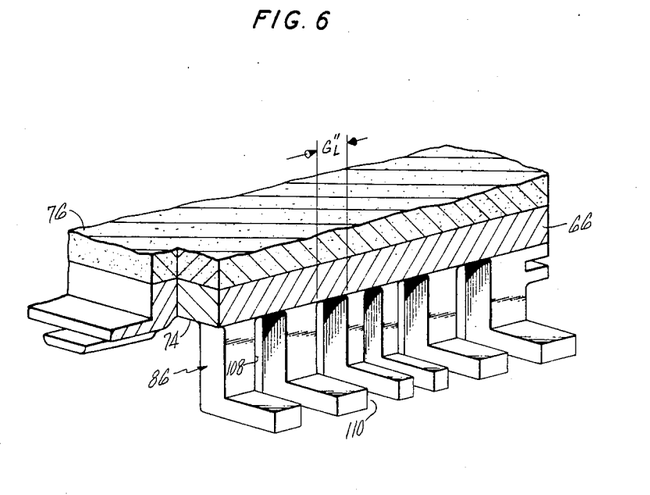
FIG. 6 is an alternate embodiment of the seal segment shown in FIG. 4.

FIG. 6 is an alternate embodiment of the view shown in FIG. 4 and illustrates an embodiment in which the slot 110 has a gap $G_L''$ and each opening in the first section forms a gap between adjacent portions of the first section which is equal in size to gap $G_L''$. During operation of the gas turbine engine 10 shown in FIG. 1, cooling air and hot working medium gases are flowed into the turbine section 12 of the engine. The hot working medium gases are flowed along the annular flow path 14. Cooling air is flowed along the first flow path 54 and enters the turbine section outwardly of the hot working medium flow path. Components of the turbine section, including the outer case 18, the outer air seal 26, and the upstream and downstream supports 34, 36 for the outer air seal are heated by the working medium gases and cooled by the cooling air.

These components of the engine respond thermally at different rates to heating by the working medium gases and to cooling by the cooling air. Factors affecting their thermal response include the thermal capacitance of the components and the exposure of the components to hot gases and to cooling air. For example, components such as the outer air seal 26 and the upstream and downstream supports 34, 36 are closer to the working medium flow path than is the outer case 18. In addition, the outer air seal and the upstream and the downstream supports have a thermal capacitance that is smaller than the outer case. As a result, the outer air seal and the upstream and downstream supports respond more quickly to changes in gas path temperature than does the outer case. An increase in the temperature of the hot working medium gases, such as occurs during acceleration and start-up, causes the outer air seal and the supports to expand, decreasing the circumferential gaps $C_g$ between the adjacent arcuate seal segments 24 which are provided to avoid destructive interference between segments.

These increases in temperatures, such as occur during acceleration and start-up, can cause severe thermal gradients in the outer air seal between the inner surface 78 of the outer air seal and the outer surface 74 of the substrate 66. This sudden imposition of the temperature gradient is referred to as thermal shock. Thermal shock is significant because of incompatabilities between the substrate and the ceramic layer which are primarily caused by differences between the coefficients of thermal expansion for the substrate and facing materials and by differences between the moduli of elasticity for the two materials over the thermal envelope which the seal segment experiences during its life. For example, the seal segment not only experiences the operating environment of a gas turbine engine, but also experiences a completely different environment during long periods of time at ambient pressure and temperature before installation in the engine and during periods when the engine is not in use. Accordingly, the substrate and the sprayed-on material must exist together at both room temperature and at operating conditions where the substrate will operate in the 1,000° F. to 1,500° F. range while portions of the surface layer may exceed 3,000° F.

Figure 7:
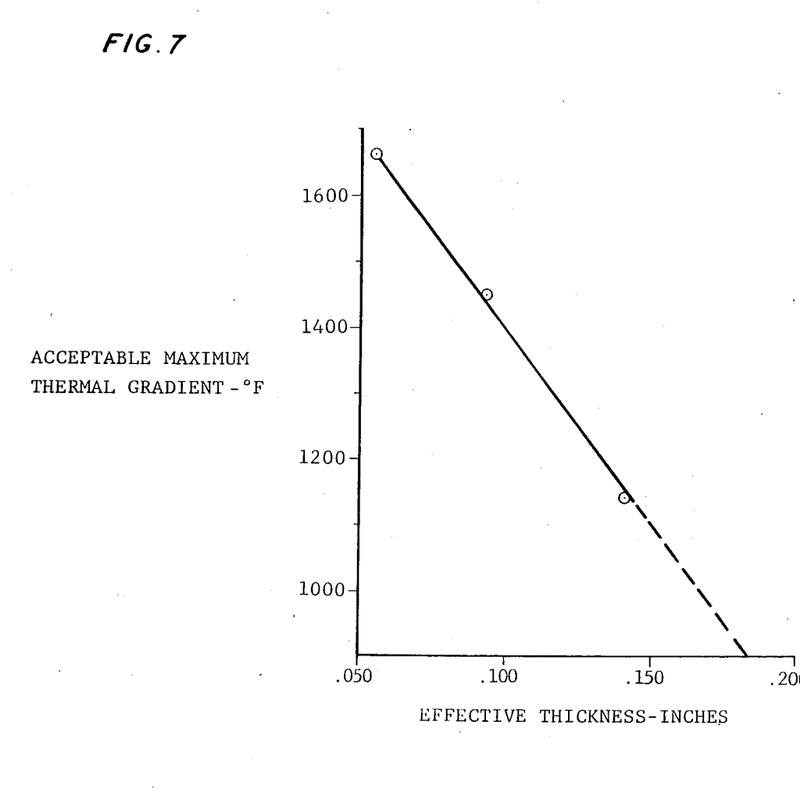
FIG. 7 is a graphical representation of the acceptable maximum thermal gradient versus the effective thickness of the substrate of the seal segment.

The thickness of the substrate and the flanges have a marked effect on the ability of the arcuate segment to sustain thermal shock. This effect is illustrated by rig and engine testing directed at determining the effect of the overall effective thickness on the ability of a ceramic faced arcuate seal segment to sustain a thermal shock. These tests were made using a test rig which directed a hot jet of gases against the inwardly facing surface 78 of the seal segment. The temperture of the surface 78 of the seal segment was monitored. At the same time, cooling air was impinged against the outwardly facing surface 74 of the substrate. The results of some of these tests are summarized in FIG. 7. FIG. 7 is a graphical representation of the maximum thermal gradient which caused the arcuate segment to fail as a function of the effective thickness of the substrate. As shown in FIG. 7, as the effective substrate thickness decreases the ability of the ceramic faced outer air seal to suffer a maximum thermal gradient without destruction increases.

As the thickness of the substrate increases relative to the thickness of the ceramic facing material, the increase in thickness increases the ability of the substrate to impose forces resulting from differences in the coefficient of thermal expansion between the ceramic material and the substrate. The effective thickness is increased (and accordingly the ability of the substrate to impose forces is increased) by the presence of flanges which extend outwardly from the substrate.

These flanges have a local effect and have an overall effect on a substrate of a given actual thickness and causes the substrate to act the same as a substrate of increased thickness, that is, the substrate has an effective thickness that is larger than the actual thickness because of the presence of the flanges. This overall effective thickness may be measured either analytically or experimentally. One experimental approach believed feasible is to support the substrate as a cantilevered beam by fixing a circumferential end to a rigid support and to apply a uniform load across the other circumferential end of the beam. Measuring the deflection (that is, the angular movement of the beam) caused by the load enables the calculation of an effective thickness for the beam if the beam is treated as having a uniform theoretical thickness. This calculated uniform thickness is called the overall effective thickness of the arcuate segment. Another approach is to use finite element analysis techniques to calculate the overall effective thickness by analytically modeling the cantilevered beam experiment.

In addition, the flanges have a local effect which results in a local increase in the stiffness (or local thickness) of the substrate. This local increase in stiffness of the substrate causes differences in deflection of the substrate between two adjacent locations of the substrate for a given thermal gradient. Because the ceramic is fixed to the substrate by a bonding layer, the ceramic experiences different deflections because it must follow the deflections of the area to which it is bonded and as a result, each location in a layer of the ceramic experiences different stresses. Using the same finite element structural analysis techniques, the local effective thickness may also be evaluated at the flange section. This is done by modeling the entire flange including the substrate to the same width as the maximum width of the flange.

Figure 8:
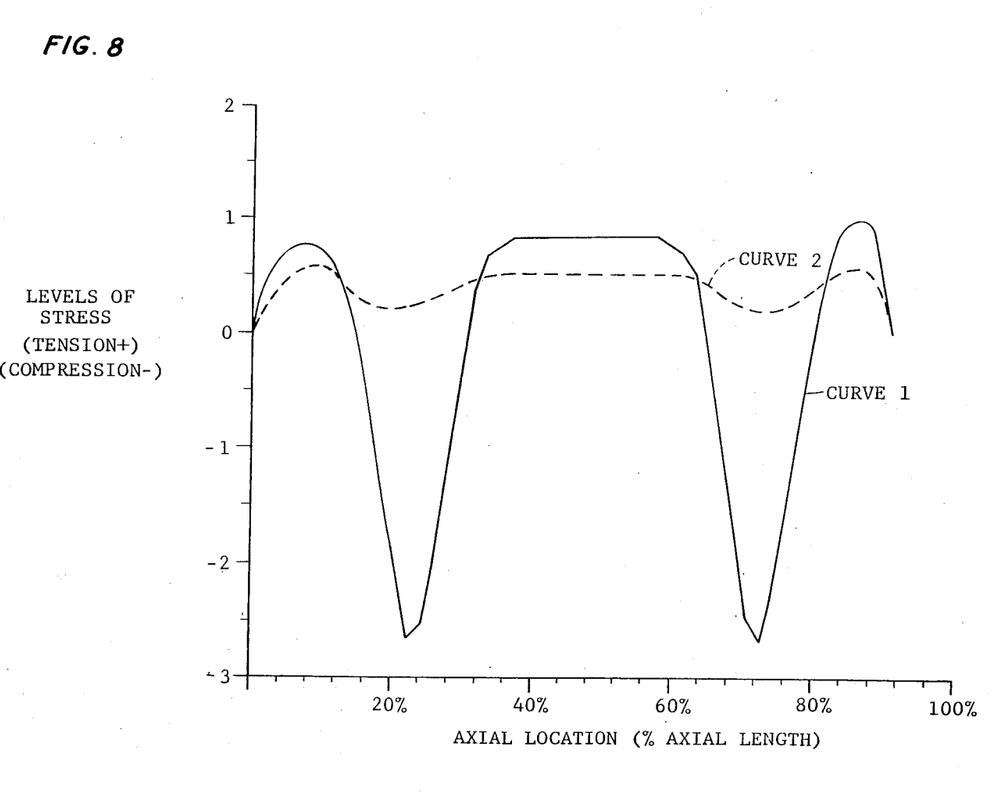
FIG. 8 is a graphical representation of the normalized level of stress for an arcuate seal segment of the type shown in FIG. 4 taken along an axial profile to show the effect of the local effective thickness on stress.

FIG. 8 shows a plot of the level of stress in the ceramic facing material along an axial section taken through two axially spaced flanges extending outwardly from the substrate when the arcute segments are at room temperature. Compressive stresses are negative and tensile stresses are positive. The curves are normalized by dividing the maximum tensile stress into all stresses. Curve 1 in full shows the stress concentration caused by flanges 30, 32 having no slots. Comparatively, dotted Curve 2 shows the reduced effect of the flanges due to the slots and openings of the embodiment shown in FIG. 4 with both a large decrease in the local variation in stresses and a decrease in the overall stresses. This decrease in the level of stresses and in the variation of stresses increases the service life of the arcuate segment as compared with components which do not have the slots and openings of FIG. 4.

Figure 9:
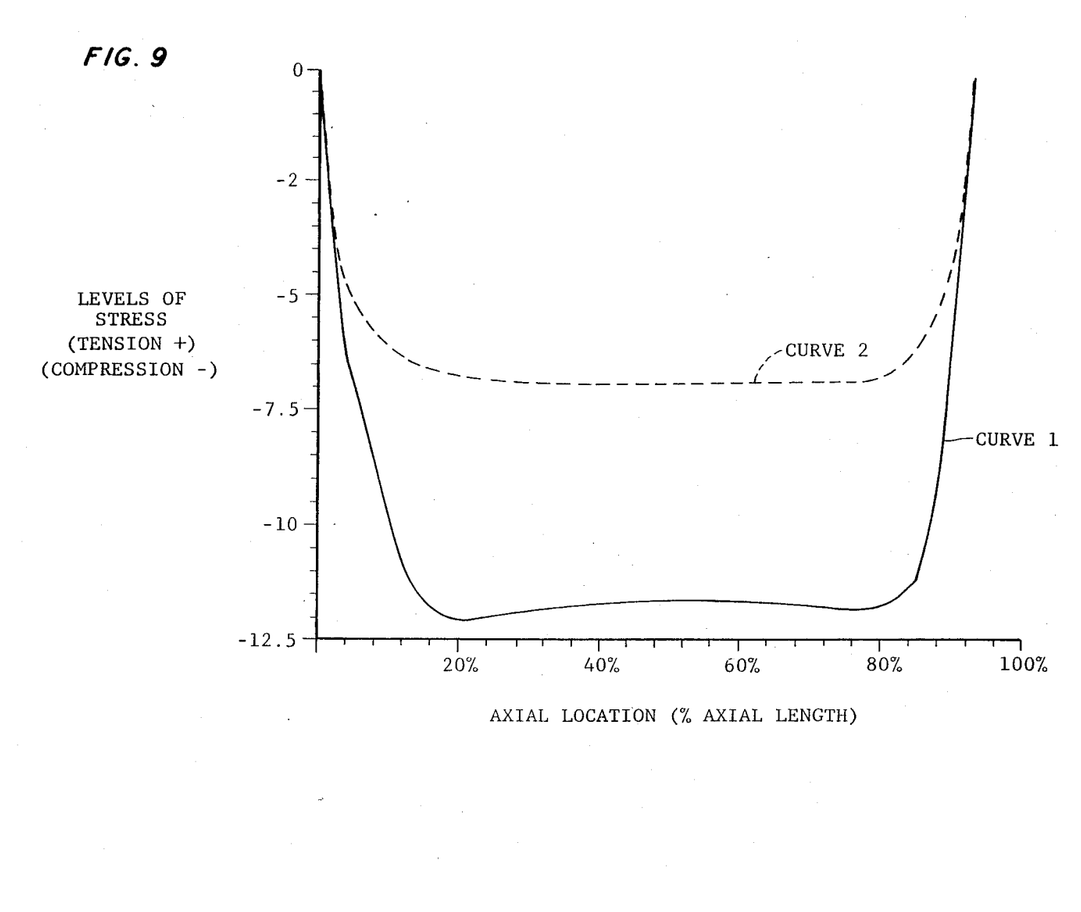
FIG. 9 is a graphical representation of the normalized levels of stress in an arcuate seal segment of the type shown in FIG. 4 taken along a circumferential profile to show the effect of the overall effective thickness on stress.

FIG. 9 shows the level of stresses for the same designs analyzed in the circumferential direction through the flange section. It is for the maximum power operating point of the engine under conditions where the coating is weakest (at its lowest strength) and is subjected to a severe thermal gradient. An arcuate seal segment with flanges having slots as shown in FIG. 4 also has a significantly reduced level of stress in the circumferential direction as shown in Curve 2 in comparison to the stress profile for an arcute seal segment having the circumferentially continuous flanges shown in Curve 1.

Based on experimental work using ceramic material formed of refractory oxides, it is believed that an outer air seal segment having a ceramic facing material as described earlier may be formed with flanges to permit the use of conventional techniques to support the segment in a gas turbine engine. Experience suggests that such a seal segment will endure a 1,500° F. thermal shock without failure from the flange caused increase in the overall effective thickness and local effective thickness of the substrate providing that certain guidelines are followed. In particular, the seal segment should have a ceramic facing layer having a thickness in the range of one hundred and twenty to two hundred thousanths of an inch (0.120 to 0.200 inches), a substrate having an actual average thickness $T_s$ which lies in a range of 70 to 100 thousanths of an inch (0.070 to 0.100 inches), an overall effective thickness that is less than 25% greater than the actual thickness of the substrate; that is, the segment has an overall effective thickness characteristic ($C_{oe}$) which is less than or equal to one and a quarter ($C_{oe} \leq 1.25$) with the overall effective thickness being less than or equal to one and a quarter (1.25) times the actual thickness of the substrate. Another guideline concerns the local effect of the actual flange thickness on the effective thickness of the substrate. Experience has shown that the local effective thickness of the substrate should be less than two and a half times the actual thickness of the substrate; that is, the local effective thickness characteristic ($C_{le}$) should be less than or equal to two and one half ($C_{le} \leq 2.5$). Finally, the first section of the flange should not have a maximum continuous local thickness which is greater than twice the thickness of the substrate (that is, the flange will have one or more openings whose inner most surface is within twice the thickness of the substrate); the summation of length in the longitudinal direction of the openings in the first section of the flange is at least equal to forty percent of the length of the flange as measured along a reference surface; and, each of the openings in the first section is connected to a second opening in the second section of the flange which extends completely through the second section of the flange.

Although the invention has been shown and described with respect to detailed embodiments thereof, it should be understood by those skilled in the art that various changes in form and detail thereof may be made without departing from the spirit and the scope of the claimed invention.

I claim:

1. A coolable arcuate wall segment of the type found in an axial flow rotary machine for bounding a working medium flow path, the segment having a substrate which includes a first surface facing in a first direction, and a second surface which faces in the opposite direction, a ceramic facing material which is fixed to the first surface to bound the working medium flow path and a pair of flanges which extend from the second surface to adapt the segment to engage a support structure wherein the improvement comprises:
   a pair of flanges fixed to the substrate which extend circumferentially about the substrate to adapt the segment to engage the support structure, wherein each of the flanges is longitudinally interrupted by openings which extend inwardly from the portion of the flange furthest away from the second surface to decrease the effect that the flanges have on the overall effective thickness of the substrate and on the local effective thickness of the substrate.

2. The arcuate wall segment of claim 1 wherein the wall segment is an arcuate seal segment, wherein the first surface is an inwardly facing surface and the second surface is an outwardly facing surface.

3. The arcuate seal segment as claimed in claim 2 wherein each flange has a first section which is fixed to the substrate which is radially oriented and which extends outwardly from the substrate and each flange has a second section which extends axially from the first section and which is spaced from the substrate by the first section to form a circumferentially extending groove, wherein each flange has a plurality of openings which extend through the flange to completely interrupt the longitudinal continuity of the second section and extend into the first section to interrupt the longitudinal continuity of the first section to decrease the effect that the flanges have on the overall effective thickness of the substrate and on the local effective thickness of the substrate.

4. The arcuate seal segment as claimed in claim 3 wherein the substrate has an actual thickness $T_s$, wherein the first section has a first region adjacent to the substrate and a second region which extends from the first region to the second section, wherein the first region has a maximum thickness measured from the substrate to the second region which is less than or equal to twice the thickness of the substrate, wherein the second region is interrupted by a plurality of openings such that the summation of the lengths of said openings as measured along a reference surface which is parallel to the surface of the substrate is equal to or greater than forty percent (40%) of the length of the flange as measured along that plane and wherein the substrate and flanges have an overall effective thickness characteristic which is less than one and a quarter (1.25) times the actual thickness of the substrate and an local effective thickness which is less than two and a half (2.5) times the actual thickness of the substrate.

5. The arcuate seal segment as claimed in claim 4 wherein the ceramic facing material contains a refractory oxide and has a thickness which lies in the range of one hundred and twenty to two hundred thousanths of an inch (0.120 to 0.200 inches), the substrate has an actual thickness which lies in the range of seventy to one hundred thousanths of an inch (0.070 to 0.100 inches), and the ceramic outer air seal has a ceramic facing surface adjacent to the working medium flow path and is able to survive a step function thermal gradient of at least fifteen hundred degrees Fahrenheit between the ceramic facing layer and the surface of the substrate to which the flanges are fixed.

6. A coolable arcuate seal segment of the type which has a ceramic facing material extending axially and circumferentially about the seal segment for bounding the working medium flow path of an axial flow rotary machine, which comprises:
   a substrate which extends axially and circumferentially and which has
      a leading edge which extends circumferentially about the segment and a trailing edge which extends circumferentially about the segment,
      an inner surface which faces inwardly, which extends axially between the edges and which adapts the segment to receive the ceramic facing material, and,
      an outer surface which is spaced from the inner surface leaving an average thickness $T_s$ therebetween; and,
   a pair of flanges fixed to the substrate which extend circumferentially about the segment, which are axially spaced one from the other, and which have a longitudinal length L along a reference surface extending substantially parallel to the outer surface of the substrate, at least one of the flanges having
      a first section extending outwardly from the substrate having a width $W_1$, a thickness $T_1$, and one or more openings which extend through the entire width of the first section and which together extend a length along a reference surface which is greater than or equal to forty percent of the length L to interrupt the longitudinal continuity of the first section;
      a second section which extends axially from the first section in the direction of one of said edges and which is spaced radially from the substrate by the first section leaving a circumferentially extending groove therebetween, the second section having a width $W_2$, a thickness $T_2$ and a slot at each opening which extends through the entire width $W_2$ and thickness $T_2$ to the opening in the first section;

wherein each opening and slot decreases the overall effective thickness and the local effective thickness of the substrate as compared to like constructions having longitudinally continuous flanges.

7. The arcuate seal segment of claim 6 wherein said flange has a second section having a first region adjacent to the first section and a second region extending axially from the first region and wherein at least one slot is configured such that the slot leaves a gap $G_L$ between adjacent portions of the section in the second region and leave a gap $G_L'$ between adjacent portions of the second section in the first region which is greater than or equal to the the gap $G_L$ ($G_L' > G_L$).

8. The arcuate seal segment of claim 7 wherein the opening to which the slot extends is configured such that the opening leaves a gap $G_L'$ between adjacent portions of the first section.

9. An arcuate seal segment of the type which has a ceramic facing material extending axially and circumferentially about the seal segment for bounding the working medium flow path of an axial flow rotary machine, which comprises.

a substrate which extends axially and circumferentially and which has a leading edge which extends circumferentially about the segment and a trailing edge which extends circumferentially about the segment, an inner surface which faces inwardly, which extends axially between the edges and which adapts the segment to receive the ceramic facing material, and, an outer surface which is spaced from the inner surface leaving an average thickness $T_s$ therebetween; and, a pair of flanges fixed to the substrate which extend circumferentially about the segment which are axially spaced one from the other, and which have a longitudinal length L along a reference surface extending substantially parallel to the outer surface of the substrate, at least one of the flanges having a first section extending outwardly from the substrate having a first region which extends outwardly from the substrate a distance $T_{11}$ which is twice the average thickness $T_s$ of the substrate ($T_{11} = 2T_s$);

a second region which extends from the first region, which has a width $W_1$ and a thickness $T_{12}$, and which has a plurality of openings extending through the entire width of the first section, the openings extending for a length to interrupt the longitudinal continuity of the first section such that the summation of lengths of said openings along a reference surface which is parallel to the surface of the substrate is equal to or greater than forty percent of the length L along that plane;

a second section which extends axially from the first section in the direction of one of said edges and which is spaced radially from the substrate by the first section leaving a circumferentially extending groove therebetween, the second section having a width $W_2$, a thickness $T_2$, and a slot at each opening which extends through the entire width $W_2$ and thickness $T_2$ of the second section to interrupt completely the longitudinal continuity of the second section and from the second section to the opening in the first section;

wherein each opening and slot decreases the overall effective thickness and the local effective thickness of the substrate as compared to like constructions having longitudinally continuous flanges.

10. The arcuate seal segment of claim 9 wherein the first region of the first section has a wall of longitudinally continuous material which extends a distance from the substrate which is less than or equal to the thickness $T_{11}$ of the first region, the wall having a width $W_1$ in the portions of the first region which extend between the substrate and the uninterrupted portions of the second region and a width $W_{11}$ in the portions of the first region which extend between the substrate and each opening in the first section wherein the width $W_{11}$ is less than the width $W_1$.

11. The arcuate seal segment of claim 10 wherein said flange has a second section having a first region adjacent to the first section and a second region extending axially from the first region and wherein at least one slot is configured such that the slot leaves a gap $G_L$ between adjacent portions of the second section in the second region and leaves a gap $G_L'$ between adjacent portions of the second section in the first region which is greater than or equal to the the gap $G_L$ ($G_L' \geq G_L$).

12. The arcuate seal segment of claim 11 wherein the opening to which the slot extends is configured such that the opening leaves a gap $G_L'$ between adjacent portions of the first section.

13. The arcuate seal segment of claim 9 wherein each opening in the first section is a slot leaving a gap $G_L$ between adjacent portions of the first section which is equal to the gap in the slot in the second section.

* * * * *